United States Patent
DePue et al.

(10) Patent No.: US 6,668,107 B2
(45) Date of Patent: Dec. 23, 2003

(54) METHOD AND APPARATUS FOR REDUCING OPTICAL INSERTION LOSS IN PLANAR LIGHTWAVE CIRCUITS THROUGH DIELECTRIC PERTURBATION OPTIMIZATION

(75) Inventors: Marshall Thomas DePue, San Mateo, CA (US); Shalini Venkatesh, Santa Clara, CA (US); Hisato Uetsuka, Hitachi (JP); Hiroaki Okano, Hitachi (JP)

(73) Assignees: Agilent Technologies, Inc., Palo Alto, CA (US); Hitachi Cable, Ltd. of Japan, Tokyo (JP)

( * ) Notice: Subject to any disclaimer, the term of this patent is extended or adjusted under 35 U.S.C. 154(b) by 56 days.

(21) Appl. No.: 10/027,498

(22) Filed: Dec. 21, 2001

(65) Prior Publication Data

US 2003/0123778 A1 Jul. 3, 2003

(51) Int. Cl.⁷ .............................................. G02B 6/26
(52) U.S. Cl. .............................. 385/17; 385/15; 385/18; 385/19
(58) Field of Search .............................. 385/15, 16, 17, 385/18, 24, 27, 28

(56) References Cited

U.S. PATENT DOCUMENTS

| | | | | |
|---|---|---|---|---|
| 5,528,710 A | * | 6/1996 | Burton et al. | 385/17 |
| 5,699,462 A | * | 12/1997 | Fouquet et al. | 385/17 |
| 6,198,856 B1 | * | 3/2001 | Schroeder et al. | 385/17 |
| 6,320,994 B1 | * | 11/2001 | Donald et al. | 385/17 |
| 6,320,995 B1 | * | 11/2001 | Schroeder | 385/17 |
| 6,327,397 B1 | * | 12/2001 | Schiaffino et al. | 385/18 |
| 6,330,376 B1 | * | 12/2001 | Paniccia | 385/14 |
| 6,351,578 B1 | * | 2/2002 | Brinkman et al. | 385/16 |
| 6,421,473 B1 | * | 7/2002 | Paniccia et al. | 385/16 |
| 2001/0024548 A1 | * | 9/2001 | Hamanaka et al. | 385/17 |

\* cited by examiner

Primary Examiner—Michael P. Stafira
Assistant Examiner—Juan Valentin, II

(57) ABSTRACT

An optical switching apparatus and a method of efficiently switching optical signals are disclosed. Optical insertion loss may be reduced in a planar lightwave circuit by determining an optimal spacing between perturbations including using passive perturbations, having a three dimensional refractive index distribution, in an array of waveguides, or by adjusting parameters of existing perturbations e.g. their spacing. The perturbation and each waveguide have different three dimensional refractive index distributions. The perturbation may be positioned anywhere in the array of waveguides. The perturbation may be a trench, a region of refractive index different from that in each waveguide, a broken waveguide core, or a modification of the topography of the array of waveguides. In one embodiment, the perturbation is a periodic or quasiperiodic perturbation.

20 Claims, 6 Drawing Sheets

METHOD AND APPARATUS FOR REDUCING OPTICAL INSERTION LOSS IN PLANAR LIGHTWAVE CIRCUITS THROUGH DIELECTRIC PERTURBATION OPTIMIZATION

BACKGROUND OF THE INVENTION

The present invention relates to the field of optical circuits. More specifically, the present invention relates to a planar lightwave circuit (PLC) having reduced insertion loss.

Optical circuits such as PLC's are used in a variety of applications. One application is in the area of communication systems. In these systems, a switching device receives a plurality of optical signals from input terminals. Then, these signals are selected, redirected, and transmitted to output terminals. Often, the redirection is performed using an array of switches in matrix layout.

In order to perform the switching functions, some switching devices first convert the optical signals into corresponding electrical signals. Next, the electrical signals are selected and redirected. Then, the electrical signals are converted back into corresponding optical signals for transmission to the output terminals. Such devices or components are often referred to as OEO (Optical-Electrical-Optical) devices. The OEO devices, because of the conversion requirements, require the use of expensive components, restrict the potential bandwidth of the data communication system, or both.

To overcome the shortcoming of the OEO devices, fully optical devices having no conversion requirements are used in some systems. In fully optical switching devices, optical signals are carried along a waveguide. Perturbations are formed within or along the waveguide to perform switching or other functions or operations on the optical signal traveling in the waveguide. Typically, the waveguides are laid out as a grid having intersections, or cross points, and the perturbations are formed at the intersections thereby creating a matrix of perturbations. For instance, a perturbation can be a liquid filled trench used as an optical switch, a doped portion of the waveguide, or other structure or material having a refractive index different than the refractive index of the waveguide. The refractive index of the switching perturbation is capable of being changed between a number of possible states, for instance between two levels. One of which causes light to pass through the perturbation without changing direction, and the other of which causes the light to change direction and pass into the crossing waveguide. In the case of a liquid filled trench, the liquid may be moved aside to leave a gaseous phase at the crosspoint, or a bubble may be created within it. In either case, the trench defines a three-dimensional index of refraction distribution, positioned at a cross-point of two waveguides, and changing its value performs the switching operation.

FIG. 1 illustrates a top view of a sample optical switching device 10 that is able to switch up to M input optical paths (designated Input-1 11,Input-2 13, . . . Input-M 15) to up to N output paths (designated Input-1 17, Input-2 19, . . . Input-M 21). In FIG. 1, the input paths, illustrated as rows, and the output paths, illustrated as columns, form a grid having M times N cross points. The input and output paths can be waveguide segments. While described herein as waveguide segments, the optical paths can be any optical paths capable of conducting an optical signal.

To perform the switching function, the device 10 includes an array of individual optical switches, one switch located at each cross point, or intersection. In FIG. 1, for convenience, these switches are designated as $S_{i,j}$ where i is the input row and j is the output column. FIG. 1 further illustrates two possible optical paths for example. The first path allows an input signal Input-1 to be redirected to an output terminal Output-2. The input signal Input-1 is illustrated by vector 12a. The input signal Input-1 12a passes through switch $S_{1,1}$ but is redirected by switch $S_{1,2}$ toward the output terminal Output-2. The redirected signal is illustrated by vector 12b. The second path is illustrated using input signal Input-2 (illustrated by vector 14a) being redirected toward an output terminal Output-N. The redirected signal is illustrated by vector 14b. The input signal Input-2 14a passes through switches $S_{2,1}$ and $S_{2,2}$ but is redirected by switch $S_{2,N}$ toward the output terminal Output-N. Such optical paths and switch configurations are known in the art. For example, see U.S. Pat. No. 5,699,462 granted to Fouquet, et al.

Various techniques of implementing the switches of the device 10 exist. For example, each of the switches of the device 10 can be implemented using mirrors, doping, liquid filled trenches, or other perturbation of the optical signal. For simplicity, the waveguides in FIG. 1 are shown intersecting each other at right angles. In this case, if the switches are implemented as liquid filled trenches, they would meet the input and output waveguides at 45 degrees. In practice, there may be good optical reasons for designing waveguides that intersect at an angle other than 90 degrees, in which case the trenches would be positioned at a correspondingly different angle with respect to the waveguides.

As an example, FIG. 2 illustrates a side view of a section 18 of the device 10 of FIG. 1 including a fluid optical switch $S_{2,2}$ having a trench 22. The switch is defined by the trench 22 formed between a break in a waveguide 24 and other layers of the device 10 including, without limitation, cladding layers 26 and a heating circuit layer 28 including a heating element 29. All the layers of the device 10 is typically built on a substrate 30. Such switches are known in the art. The trench 22 is filled with gas or boilable liquid and is fabricated such that the trench 22 obliquely crosses the waveguide 26. Optical signals, for example, optical signal 14a, travel along the waveguide 26 and either crosses or is redirected by the switch $S_{2,2}$ depending upon the state of the liquid in the trench 22.

Optical signal loss occurs at each stage of the transmission. This is called insertion loss. The insertion loss of a component or an optical path is normally defined as the difference between the power entering and leaving the component or optical path. The insertion loss limits the distance over which the signal can travel. In a device, such as an optical switch, the insertion loss limits the number of switches that can be effectively used to control or operate on input signals. Accordingly, there remains a continuing need for methods and apparatus to reduce and minimize the insertion losses in an optical switch and other optical components.

SUMMARY

These needs are met by the present invention. According to one aspect of the present invention, a planar lightwave circuit (PLC) includes an array of waveguides intersecting at cross-points, each waveguide having a waveguide refractive index distribution for guiding an optical signal. The PLC further includes active perturbations for operating on the optical signal and passive perturbations having a refractive index distribution different than the waveguide refractive index distribution for reducing insertion loss of the PLC.

According to a second aspect of the present invention, an integrated optical circuit includes a waveguide for conducting optical signals and active perturbations for operating on the optical signal. Further, the circuit includes passive perturbations such that spacing between perturbations leads to reduction in insertion loss of the circuit.

According to a third aspect of the present invention, a planar lightwave circuit (PLC) has an array of waveguides intersecting at cross-points, each waveguide having waveguide refractive index distribution for guiding optical signal. Further, the PLC includes perturbations for operating on the optical signal, the perturbations spaced to minimize insertion loss of the PLC.

According to a fourth aspect of the present invention, a method of efficiently operating on optical signals within a waveguide of an integrated optical circuit is disclosed. Active perturbations operate on the optical signal to perform a function. The optical signal passes through passive perturbations. The active perturbations and the passive perturbations have a predetermined spacing whereby insertion loss is reduced.

According to a fifth aspect of the present invention, a method of fabricating an integrated optical circuit including a waveguide for conducting optical signal is disclosed. The circuit is fabricate having perturbations with predetermined spacing thereby reducing insertion loss.

According to a sixth aspect of the present invention, a planar lightwave circuit includes an array of waveguides which intersect at crosspoints, each waveguide having a three dimensional refractive index distribution for guiding light. The circuit further includes a plurality of perturbations positioned within the array, each perturbation having a three dimensional refractive index distribution different than that of each waveguide, and operative to reduce optical insertion loss.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
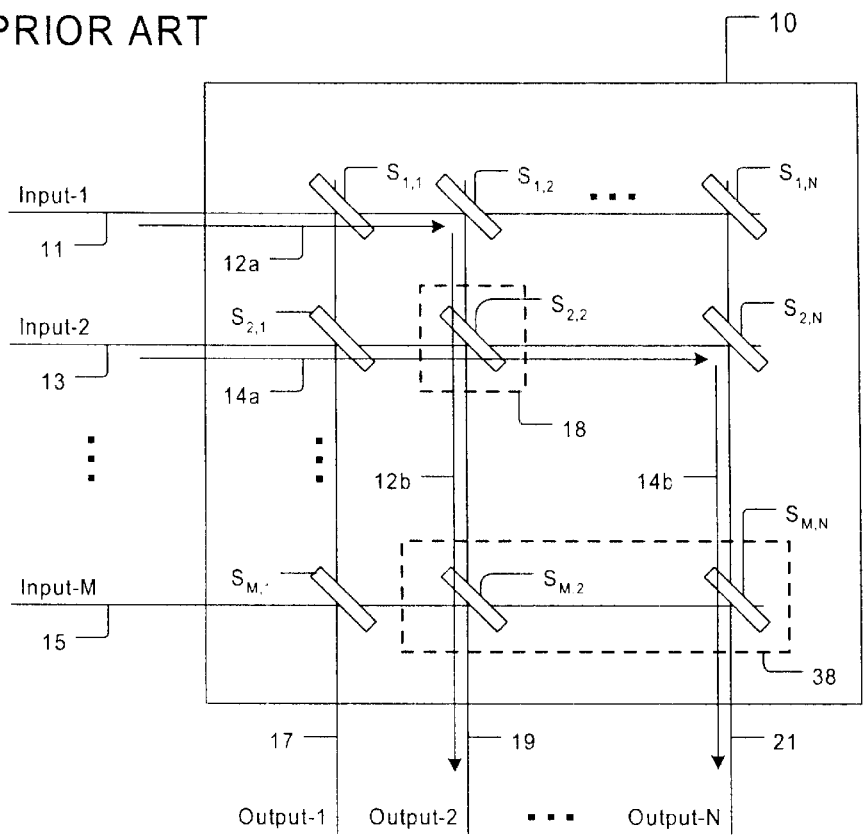
FIG. 1 is a schematic top view of an optical switching device.

As shown in the drawings for purposes of illustration, the present invention is embodied in a method of and apparatus for reducing insertion loss in optical devices. In the following detailed description, references are made to the accompanying drawings, which form a part hereof, and in which are shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

The foundational impetus for the present invention is based on a counter-intuitive discovery that insertion loss may be reduced by having the optical signal pass through a greater number of perturbations rather than a smaller number in certain configurations.

Figure 2:
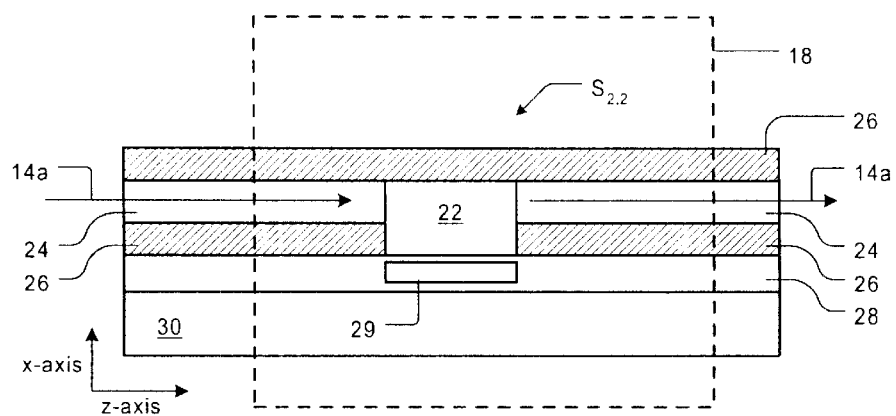
FIG. 2 is a side view of a section of the device of FIG. 1.

An optical waveguide can transmit optical signals, or light, in both guided and unguided modes. In the guided mode, light propagates down the waveguide via total internal reflection and has a substantial fraction of its power confined within the waveguide, whereas in the unguided modes, power is lost as light propagates away from the guiding layer; the unguided light does not propagate a significant distance along its direction of travel, for example, in the z direction of FIG. 2. The lowest order guided mode has the largest fraction of the power of the optical signal directed along the direction of its travel.

In designing communication systems with guided wave optics, it is preferable to design a system that has only the lowest order guided mode present. This minimizes dispersion and loss associated with the presence of higher order modes. The feasibility of such single mode structures has been dramatically demonstrated in recent years. Much of the optical fiber and waveguides in today's optical network supports only a single mode at the operating wavelength.

If light traveling within a waveguide is confined to a particular guided mode, it remains in that mode as long as it is traveling in a perturbation-free environment. In many optical devices, including a variety of Planar Lightwave Circuits (PLCs) and optical switches, structures are added to the waveguide that operate on the guided light to accomplish a particular function. As already discussed, for instance, a trench or waveguide segment is often used at an intersection, or cross-point, of two waveguides to perform a switching operation in an optical switch. Such a structure is a perturbation in the path of the light and introduces insertion loss.

Perturbations create a variation in dielectric constant in the region of the perturbation. On encountering a variation in the dielectric constant, the optical signal, or the light, behaves differently than it does within the waveguide. Typically, each perturbation causes the light to lose some of its power due to diffraction and radiation. Therefore, in general, as the number of perturbations in an optical path increases, the insertion loss of the path increases.

Figure 3:
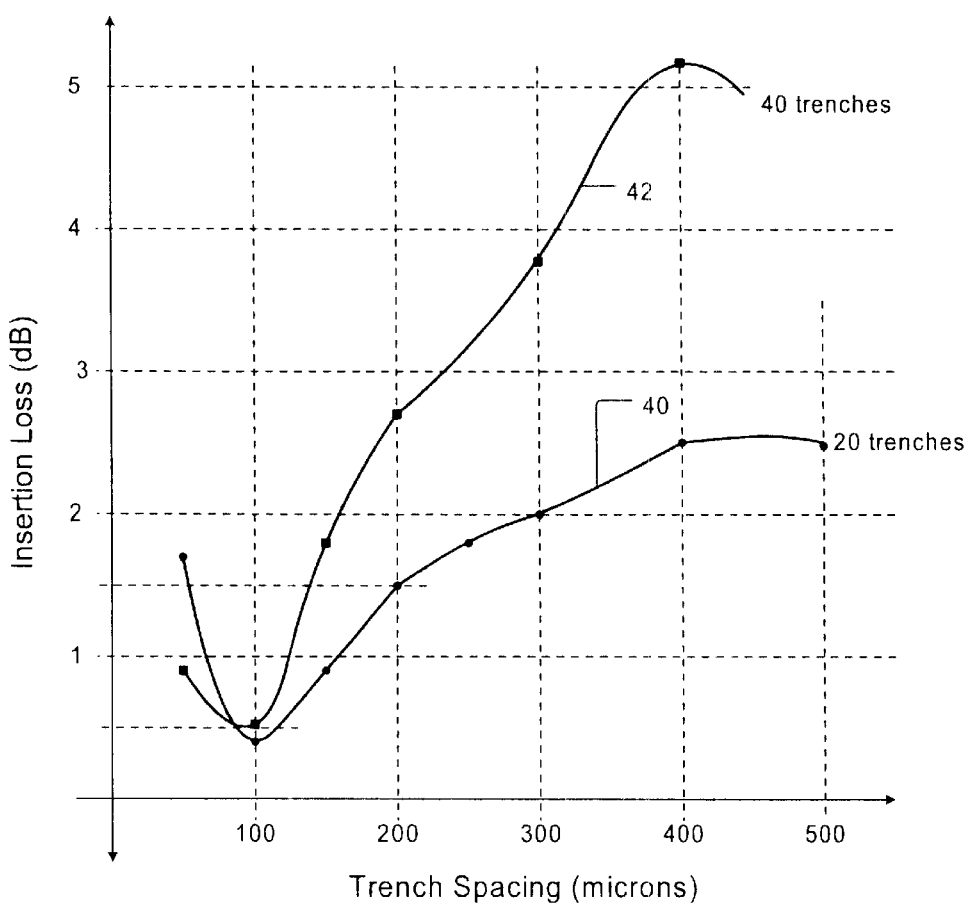
FIG. 3 is a graph illustrating the relationship between the number and the spacing of trenches and the insertion loss.

However, by controlling the spacing, width, and spatial refractive index distribution of the perturbations, it is possible to decrease the insertion loss even though the number of perturbations is increased. This counter-intuitive result is graphically illustrated in FIG. 3. This graph shows the results of simulations based on a beam propagation algorithm, carried out for a particular set of waveguide parameters (core and cladding index, dimensions of the core etc), but the trends shown are generally applicable, with differences in the exact values of loss and distance. FIG. 3 illustrates a first curve 40 depicting the relationship between spacing of the trenches (in microns) and the total insertion loss of the path having 20 trenches. Also illustrated in FIG. 3 is a second curve 42 depicting the relationship between spacing of the trenches (in microns) and the total insertion loss of the path having 40 trenches. Accordingly, it is possible to reduce the insertion loss of an optical circuit by adding additional perturbations such that the insertion loss of the circuit with additional perturbations is less than insertion loss of another circuit of identical configuration but without the additional perturbations. This is discussed in more detail herein below.

As the graph of FIG. 3 illustrates, in general, as the number of perturbations, trenches in the present example, increases, the path suffers a higher signal loss. However, by varying the spacing of the trenches, insertion loss can be reduced even though the number of trenches is increased. For instance, as the graph shows, the insertion loss for 20 trenches with trench spacing of 200 microns is about 1.5 dB in this particular case. In comparison, the insertion loss for 40 trenches with trench pacing of 100 microns is only about 0.5 dB. Therefore, maintaining a same total optical path length of about 4000 microns, it would be advantageous to fabricate 40 trenches, or perturbations, at 100 micron intervals rather than 20 trenches at 200 micron intervals. This would be true whether or not all 40 trenches would be used for redirecting the optical signal. For clarity, those perturbations that are designed for use in, or can be used for, redirecting the optical signals (for example, for switching functions) are referred to as active perturbations (or active trenches) herein below, and those perturbations not designed for use in, or cannot be used for, such a purpose are referred to as passive perturbations (or passive trenches) herein below. Further, the term "perturbation" refers to and can be both active perturbation and passive perturbation.

This counter-intuitive result is arrived by an understanding of various effects involving perturbations and mode conversions of light as the optical signal crosses the perturbations. Light propagating near a dielectric perturbation can be thought of as being comprised of a number of modes. A description of the light at a dielectric perturbation includes a sum over all of possible modes including a finite number of possible guided modes and an infinite number of radiation, or continuum, modes. Dielectric constants, geometry, and symmetry of the perturbation determine which modes are present as well as their relative proportions. It is through this mechanism that a perturbation in the dielectric constant can couple modes and allow an exchange of energy from one mode into higher order modes.

Mode conversion and coupling can be a source of loss. Radiation modes excited near an obstacle such as a trench or other perturbations may not be re-trapped and guided into the waveguide on the other side of the perturbation, thereby losing power. The magnitude of such a loss depends on the nature of the dielectric perturbation, $\Delta\epsilon$, which in turn depends on the refractive index distribution, $\Delta n$, as well as the geometry and symmetry of the structure. Symbols used in the equations of this document not specifically described herein have the usual and conventional meaning in the context of its use within the field of the present technical art. Perturbations in the dielectric constant can be designed that perform useful functions on the light and simultaneously minimize optical loss. A successful strategy to carry out these goals depends on two key requirements. First, the coupling to lossy higher order guided and radiation modes is minimized by careful design of the waveguide structure and perturbation. Second, the phases of the excited modes near a perturbation should be tuned to maximize the re-coupling of the radiation back into the unperturbed portion of the waveguide. These ideas are described in greater detail herein below with the aid of a simple model.

Effects of multiple perturbations on an optical signal may be modeled as the effects of a series of simple lenses on the optical signal. In general, light traversing a perturbation 50 (illustrated as a trench 50) in FIG. 4 will diffract and scatter from the obstacle as shown by vectors 51. Light originating from the input waveguide 54 that scatters from the perturbation may not lie within the output waveguides' 56 numerical aperture, thus realizing optical loss. Optical loss may also occur from diffraction; the spreading out of the light as it crosses trench 50 leads to a larger size, and thus poorly mode-matched, beam of light at the output waveguide 56. Excitation of higher order "leaky" modes can lead to additional optical loss; the trench refractive index distribution, geometry, and symmetry can be optimized to prevent the excitation of these higher order modes.

Figure 5:
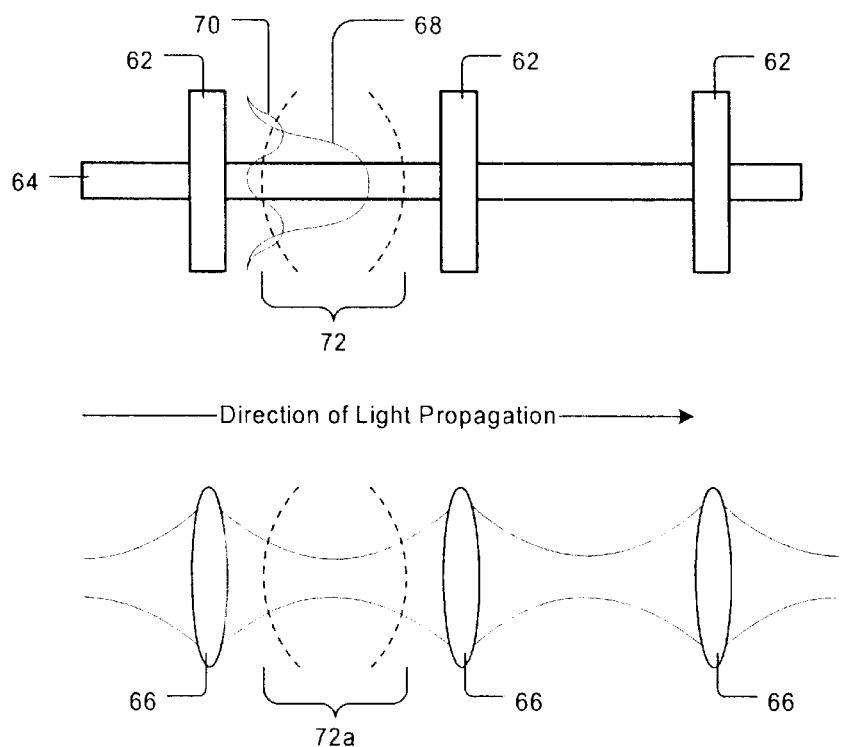
FIG. 5 illustrates behaviors of optical signals as they pass through an array of perturbations and lenses.

The lens analogy is useful in describing the loss characteristics of a number of dielectric perturbations in series; from laser resonator theory an optimal lens spacing is known to exist that allows a lens-waveguide to support a stable, confined beam with low optical loss. In FIG. 5, an array of trenches 62 across a waveguide 64 can behave as a lens resonator having an array of lenses 66 to form similar wavefronts. For the trench array, the dominant mode component 68 and the higher-order mode components 70 of the optical signal combine in superposition to form a wavefront 72. A similar wavefront 72a is formed by the lens array. The trench geometry and refractive index distribution is selected so that the phases of the dominant mode and any higher order modes excited by the trench perturbation are adjusted appropriately to allow recapture within the coupling length of the output waveguide.

Figure 4:
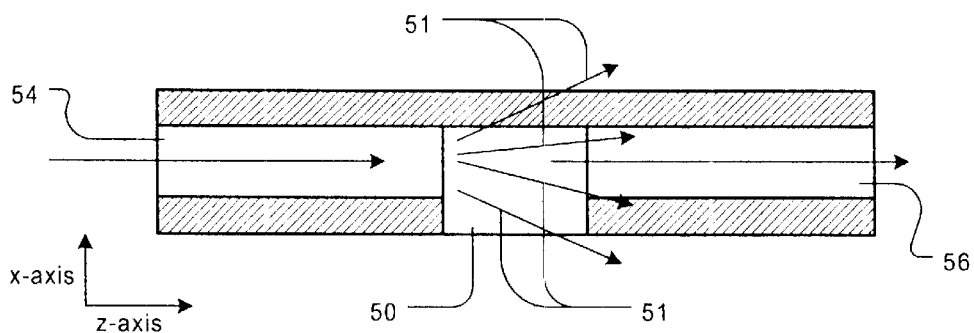
FIG. 4 illustrates a model of a perturbation acting on an optical signal.

However, it is true that the lens analogy of a trench perturbation does not perfectly describe a trench. A true lens adjusts the phase characteristics of incident light in a well-known fashion. For an incident plane wave, a lens creates a spatially dependent phase difference:

$$\text{phase difference} \approx \frac{2\pi}{\lambda}\left(\frac{x^2+y^2}{2f}\right),$$

where $f$ is the focal length of the lens, $\lambda$ is the wavelength of light, and x and y are the Cartesian coordinates transverse to the direction of light propagation as indicated in FIG. 4. In general, a waveguide perturbation will not impart this exact phase shift. It is a more complicated function depending on the propagation constants of the excited modes as well as the geometry and refractive index distribution of the perturbation. Additionally, a waveguide perturbation can lead to the excitation of lossy higher order modes. Accordingly, it is helpful to consider a more involved formulation to further explore the parameters important for loss reduction in waveguide structures with dielectric perturbations.

In the scalar approximation, the electromagnetic field within an optical waveguide obeys the Helmholtz wave equation. If the special case of transverse electric (TE) modes and a slab waveguide is considered, the electric field in the unperturbed guide shown in FIG. 1 satisfies:

$$\nabla^2 E_y(x,z,t) - \epsilon\mu\frac{\partial^2 E_y(x,z,t)}{\partial t^2} = 0, \qquad (1)$$

where $E_y(x)$ is the transverse electric field of the light, $$\nabla^2 = \frac{\partial^2}{\partial x^2} + \frac{\partial^2}{\partial y^2}$$

represents the transverse derivatative, and $\epsilon$, $\mu$ are, respectively, the dielectric and permeability constants of the waveguide material.

A particular mode of the structure is given by $$E_y(x,z,t) = E_y^j(x) e^{-i(\beta^j z - \omega t)} + c.c., \quad (2)$$

where $E_y^j(x)$ is the normalized transverse spatial profile of the $j^{th}$ mode with propagation constant $\beta_j$. The presence of a dielectric perturbation changes equations (1) and (2).

In the presence of a dielectric perturbation, the waveguide material is polarized differently than it would be in the absence of the perturbation. In general, the displacement field becomes:

$$D = \epsilon E + P_{Pert} \quad (3)$$

as opposed to $D = \epsilon E$ in the unperturbed problem. The perturbation takes the explicit form $P_{Pert}(x,z,t) \approx \Delta \epsilon E_{incident}(x,z,t)$, and represents the interaction of the incident light with the perturbed dielectric constant. In this equation, $\Delta \epsilon$ represents the change in dielectric constant created by the perturbation, and $E_{incident}(x,z,t)$ is the incident electric field. In many practical situations, $E_{incident}(x,z,t)$ is the electric field distribution of the single-mode, unperturbed waveguide. Physically, the new term $P_{Pert}(x,z,t)$ represents a localized volume dipole moment. When (3) is inserted into Maxwell's equations, one obtains a modified wave equation:

$$\nabla^2 E_y(x,z,t) - \epsilon \mu \frac{\partial^2 E_y(x,z,t)}{\partial t^2} = \mu \frac{\partial^2 P_{Pert}(x,z,t)}{\partial t^2}. \quad (4)$$

The interpretation of equation (4) is that the modified polarization, $P_{Pert}$, adds a source term to the wave equation in (1). It is this source term that is ultimately responsible for allowing modes to be coupled and their relative phases and decay lengths adjusted.

Any deviation from an ideal waveguide will in general cause coupling, or energy flow, between different modes. Suppose, for example, light in the form of the equation (2) is incident on a dielectric perturbation such as a trench. The representation of the light near the trench is no longer the simple equation shown in equation (2). Rather it becomes a sum over an infinite number of modes as follows:

$$E(x,z,t) = \sum_j \left\{ a_j^{+z}(z) E_y^j(x) e^{-i(\beta_j z - \omega t)} + \right. \quad (5)$$
$$\left. a_j^{-z}(z) E_y^j(x) e^{i(\beta_j z + \omega t)} \right\} +$$
$$\int d\beta a(\beta,z) E_\beta(x) e^{-i(\beta z - \omega t)} + c.c.$$

The coefficients $a_j(z)$ in (5) determine how much of each mode is present and are themselves determined by the specific details of the perturbation. That these coefficients depend on distance illustrate how different mixtures of modes can exist as a function of position along the waveguide. The coefficients $a_j^{+z}(z)$ represent waves traveling in the original propagation direction, while the $a_j^{-z}(z)$ are reflected waves generated by the obstacle. There are two types of modes present in the formula: guided modes and radiation modes. The discrete sum includes guided modes while the integral is a sum over the infinite number of radiation modes. Thus, a careful through-loss optimization focuses on understanding the continuum of radiation modes and learning how to subtly adjust their phases and decay lengths to ensure optimal re-coupling.

Equation (5) is difficult to work with because of mathematical complexities surrounding the integral over radiation modes. In practice, through-loss optimization is best carried out with a numerical solution of Maxwell's equations. For this, simulation software, utilizing the BPM algorithm, is commonly employed.

These mathematical models are described to provide a deeper understanding of the role the perturbation plays. Although radiation modes are important in practical devices, the complexity of the integral over radiation modes in equation (5) obscures the basic physics of the simple model. For clarity of exposition, and without loss of generality, it is possible to drop the radiation modes (for example, by employing a suitable and well-known discretization procedure) and consider the electric field as a sum of discrete modes only:

$$E(x,z,t) = \sum_j \left\{ a_j^{+z}(z) E_y^j(x) e^{-i(\beta_j z - \omega t)} + \right. \quad (6)$$
$$\left. a_j^{-z}(z) E_y^j(x) e^{i(\beta_j z + \omega t)} \right\} + c.c.$$

Inserting equation (6) into the modified wave equation (4), and assuming the amplitudes vary slowly with position (slowly varying amplitude approximation), the following equation is found for the mode amplitudes $a_j(z)$:

$$\sum_j 2i\beta_j \frac{\partial a_j^{-z}}{\partial z} E_y^j(x) e^{i(\beta_j z + \omega t)} - \quad (7)$$
$$\sum_j 2i\beta_j \frac{\partial a_j^{+z}}{\partial z} E_y^j(x) e^{-i(\beta_j z - \omega t)} = \mu \frac{\partial^2 P_{Pert}}{\partial t^2}.$$

This equation can be further simplified by using the orthogonality property of the transverse electric modes as follows:

$$\int_{-\infty}^{+\infty} dx E_y^i(x) E_y^j(x) = \frac{2\mu\omega}{\beta_i} \delta_{ij}. \quad (8)$$

Using equation (8), simple algebra converts equation (7) into a differential equation, the so-called coupled mode equations, for the amplitudes:

$$e^{i(\beta_j z + \omega t)} \frac{\partial a_j^{-z}}{\partial z} - e^{-i(\beta_j z - \omega t)} \frac{\partial a_j^{+z}}{\partial z} = \quad (9)$$
$$-\frac{i}{2\omega} \frac{\partial^2}{\partial t^2} \int_{-\infty}^{+\infty} dx E_y^j(x,z,t) P_{Pert}(x,t).$$

Equation (9) shows that the coupling into mode j depends on the overlap integral of the mode j multiplied by the perturbation. If the incident light is contained in mode m, we have $E_y^m(x,z,t) = a_m^{+z}(z) E_y^m(x) e^{-i(\beta_m z - \omega t)}$ and thus the perturbation takes the form:

$$P_{P_{ert}}(x, z, t) = \Delta\varepsilon(x, z) \cdot E_y^m(x, z, t) \quad (10)$$

$$= \Delta\varepsilon(x, z)a_m^{+2}(z)E_y^m(x)e^{-i(\beta_m z - \omega t)}.$$

The perturbation is seen to couple mode m into mode j via the overlap integral.

Several interesting features stand out in equation (9). First, in the limit of a very weak perturbation, $P_{Pert}(x,z,t) \approx 0$, there is no coupling between modes. Instances of no coupling can occur when the overlap integral vanishes such as in special occasions where the perturbation has a high degree of symmetry. For example, a symmetric notch in a slab waveguide can only couple the lowest order mode to a higher order mode with even symmetry. Another result found by analyzing the overlap integral is that power can oscillate back and forth between modes as a function of the length of the obstacle. The coupling in this case is often enhanced when the perturbation makes up the difference, $\Delta\beta$, between the propagation constants of the modes in question. In practice this occurs when the length L of the perturbation is of order $\Delta\beta$ $$\Delta\beta \propto \frac{1}{L}.$$

In a similar fashion, a periodic perturbation, with spacing $\Lambda$, can couple modes. In this case, a particular spatial Fourier component of the perturbation causes coupling when $\Delta\beta \propto 1/\Lambda$. A more detailed treatment of this phenomena is described in "Quantum Electronics" by Yariv in Chapter 22, 1989. Mode coupling via the spacing of the perturbations may contribute to optical loss.

Although a rigorous approach in determining optical loss of an arbitrary waveguide structure requires a numerical solution, a simple model based on discretized radiation modes and perturbation theory illuminates the key physics. To describe the electric field near a dielectric obstacle, one must employ an infinite number of modes in superposition. The perturbation couples power from the incident mode into any number of excited modes. Depending on the phases and decay lengths of these excited modes, the light may not efficiently couple back into the waveguide upon traversing the perturbation. An optimization of the optical loss depends on the ability to tune the number and phases of the excited modes by carefully optimizing the index of refraction variation, symmetry, and geometry of the perturbation.

In particular, the spacing and the total number of the perturbations are used for the present invention to reduce total insertion loss of various optical paths of an optical device. The present invention is directed towards reducing optical insertion loss within an apparatus such as an optical switching array by introducing refractive index perturbations. These perturbations may be additional trenches, regions of varying refractive index, geometric variation of characteristic waveguide dimensions, index profile, breaks in the waveguides, or any combination of these.

Figure 6:
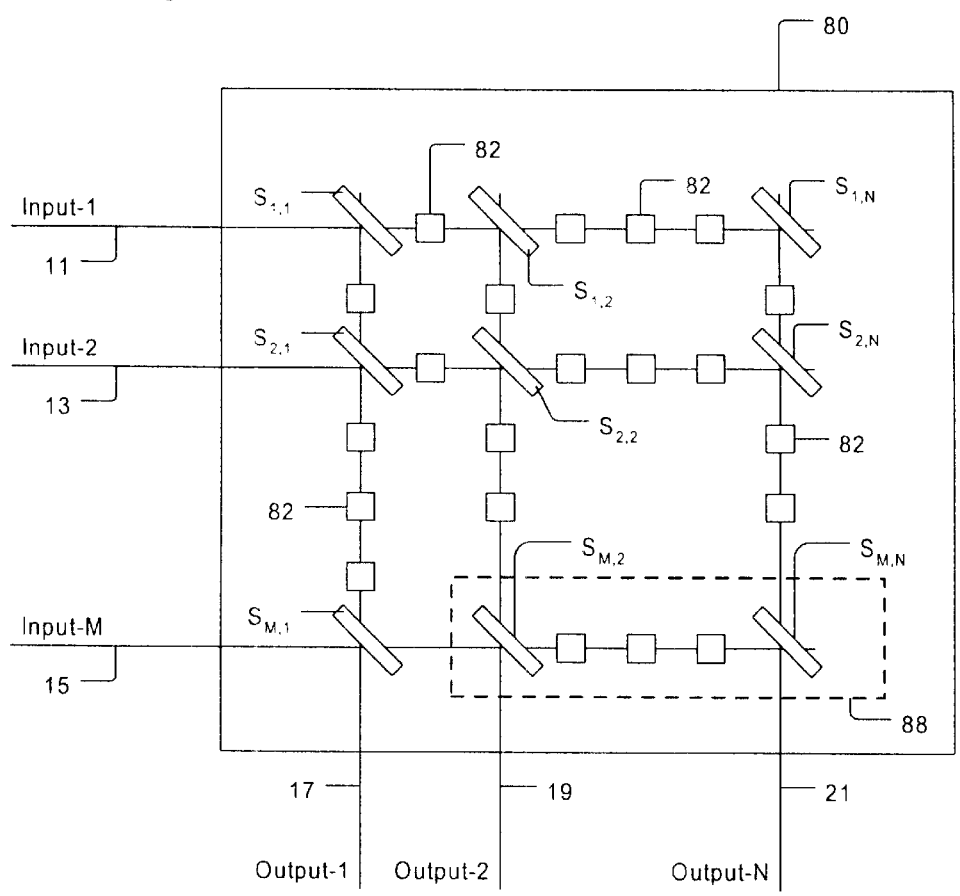
FIG. 6 illustrates an apparatus according to one embodiment of the present invention.

Referring to FIG. 6, a top view of an optical apparatus 80 including one embodiment of the present invention is illustrated. FIG. 6 has portions that are similar to certain portions of FIG. 1. For convenience, portions of FIG. 6 that are similar to portions of FIG. 1 are assigned the same reference numbers and designators. The apparatus 80 is, for example, a planar waveguide circuit (PLC).

Similar to the device 10 of FIG. 1, the apparatus 80 of FIG. 6 an array of waveguides including input optical signal paths 11, 13, and 15 (representing inputs 1 to M) and output signal paths 17, 19, and 21 (representing output 1 to N) forming a grid of M rows by N columns with M times N intersections, or cross-points. The input and output paths can be waveguide segments. While described herein as waveguide segments, the optical paths can be any optical paths capable of conducting an optical signal, for example, optical fiber. The apparatus 80 can be a planar lightwave circuit.

While illustrated as single lines, input waveguides 11, 13, and 15, and output waveguides 17, 19, and 21 are cores or channels supported by a substrate, cladding, or both, and through which light travels. Each waveguide has a three dimensional refractive index distribution, waveguide refractive index distribution, for guiding light.

While illustrated as a matrix of three rows and three columns for a total of nine optical switch points, the apparatus 80 may include any number of input waveguides and output waveguides, having a commensurate number of cross point switches at the intersections thereof. Furthermore, while illustrated as intersecting at right angles, the input waveguides and the output waveguides can intersect at angles other than right angles. For example, the apparatus 80 may be an optical switch matrix having a 32 by 32 matrix having 32 input waveguides and 32 output waveguides, or even larger. For simplicity, a 3 by 3 optical switch matrix is illustrated herein as the apparatus 80. Furthermore, in the present sample apparatus 80, while apparently illustrated as continuous waveguide sections, each of the input paths (11, 13, and 15) and the output paths (17, 19, and 21) crosses multiple switch elements, $S_{i,j}$, at trenches, thus resulting in each input waveguide and each output waveguide being comprised of a plurality of waveguide segments. In use, the waveguide segments can be connected to optical fibers at the inputs and outputs. For example, the input waveguides 11, 13, and 15 and the output waveguides 17, 19, 21 can be connected to optical fiber ribbon cables using V-groove arrays, the waveguides being typically spaced on the order of 0.25 millimeters apart. Here, the switches $S_{i,j}$ are active perturbations for operating on the optical signal.

To perform the switching function, the apparatus 80 includes an array of individual optical switches, one switch located at each cross point, or intersection and designated $S_{i,j}$ where i is the input path and the j is the output path the switch is connected. The switches are transmissive, in that when filled with an index matching medium, such as a liquid having a refractive index same as or similar to the refractive index of the waveguide segments (of the input and output paths), the switches allow light traveling in the waveguide to pass directly through. When devoid of the index matching medium, such as when the switch (a trench) is filled with a gas, or bubble, the incident light is reflected into an adjoining waveguide, instead of being transmitted through the switch. For the purpose of the present invention, the switches, $S_{i,j}$, are considered active perturbations that operate on the optical signals passing through.

The apparatus 80 further includes passive perturbations 82 for reducing insertion loss of various paths of the apparatus 80. To avoid clutter, in FIG. 6, only some of the passive perturbations 82 of the apparatus 80 are pointed out by the reference numeral 82. The passive perturbations 82 increase the number of perturbations that an optical signal encounters within the apparatus 80 thereby, apparently, increasing the insertion loss of the apparatus 80. However, as discussed in detail herein above, especially with reference to the graph of FIG. 3, by decreasing the spacing of the perturbations, both active and passive, the addition of the passive perturbations can reduce the insertion loss through the apparatus 80. As already discussed, the passive perturbations 82 can be trenches, regions of varying refractive index, geometric variation of characteristic waveguide dimensions, index profile, breaks in the waveguides filled by cladding material, or any combination of these. Each passive perturbation has a three dimensional refractive index distribution, that is different than that of each waveguide. Further, each passive perturbation refractive index can be same or different than the refractive index of active perturbations. In the illustrated implementation, the active perturbations (the switches) operate on the optical signal to perform a function such as switching while the passive perturbations 82 pass the optical signal through.

The passive perturbations 82 can be positioned anywhere in the array of waveguides. In FIG. 6, the passive perturbations 82 are illustrated as being between active perturbations, or switches $S_{i,j}$. However, one or more passive perturbation 82 can be positioned at an intersection.

In another embodiment, at least one passive perturbation 82 can be a region of doping concentration different from that in each waveguide, a broken waveguide core, a modification of the topography of the array of waveguides, or any combination of these. For any given waveguide and passive perturbation refractive index distribution, there can be one or more optimal spacings between perturbations (active, passive, or both) for minimal insertion loss. In yet another embodiment, the perturbation is a periodic or quasiperiodic perturbation.

The insertion loss can be made nearly independent of wavelength over a range of wavelengths. The amount of wavelength dependent loss reduction depends on the particular perturbation's spatial refractive index distribution and the waveguide's geometry and refractive index characteristics. In particular, the wavelength dependent loss can be reduced over the wavelength interval 1450–1650 nanometer (nm).

One illustrative embodiment of the present invention is shown in Table 1, below. The refractive index distribution for the waveguides is selected for coupling into single mode optical fibers in both the description of the prior art and the present invention. In the present example, passive perturbation in the form of dummy trenches are placed between the active perturbations, or switching elements. An advantage to using the dummy trenches (instead of a reduced spacing and a number of trenches equal to the port-count of the device) is that the device can be attached to a standard fiber v-groove array or a array of optical fibers on a standard 250 micron pitch. A loss reduction of 2.3 dB is achieved when the periodicity of the perturbations is reduced from about 260 mirons to about 90 microns even though the total number of trenches has increased by a factor of about three. In this particular case, this loss reduction is achieved by inserting two dummy trenches evenly spaced between each pair of active trenches. In our experiments, the periodicity of between 90 and 100 microns has worked well; however, ideal periodicity for each circuit depends on a variety of factors such as the refractive index of the waveguide, refractive index of the active and passive perturbations, frequencies of the optical signal, etc.

TABLE 1

| PARAMETER | PRIOR ART | INVENTION |
| --- | --- | --- |
| Waveguide refractive index delta | 0.348% | 0.348% |
| Waveguide upper cladding thickness | 14 microns | 14 microns |
| Waveguide height | 8 micron | 8 micron |
| Waveguide width | 16 micron | 16 micron |
| Trench width | 15 microns | 15 microns |
| Trench spacing (periodicity) | ~260 microns | ~90 microns |
| Insertion loss (through path) | ~4.3 dB | ~2.0 dB |

A second illustrative embodiment which, like the first, has been experimentally verified, uses the same waveguide dimensions, a trench width of 14.2 micron, and a refractive index delta of 0.33%. Changing the trench spacing from about 260 um to about 65 um, increasing the number of trenches by a factor of about 4 reduces the insertion loss for a path passing through 32 active trenches from about 4.1 dB to about 2.2 dB.

A third illustrative embodiment uses the same waveguide dimensions, an active trench width of 15 micron, a refractive index delta of 0.30%, and, instead of dummy trenches, two core breaks, filled by cladding material, evenly spaced between the trenches. The core break width is 10 micron. Calculations predicted the insertion loss of a test chip would be reduced from about 2.6 dB without the core breaks to about 1.3 dB with them. A PLC chip made to this design was measured to have a loss of about 1.4 dB.

The apparatus 80 can be fabricated as an integrated optical circuit where the perturbations are fabricated in predetermined spacing thereby reducing insertion loss as described in detail herein. The perturbations include active and passive perturbations and can be spaced within a range between 90 and 110 microns.

Figure 7A:
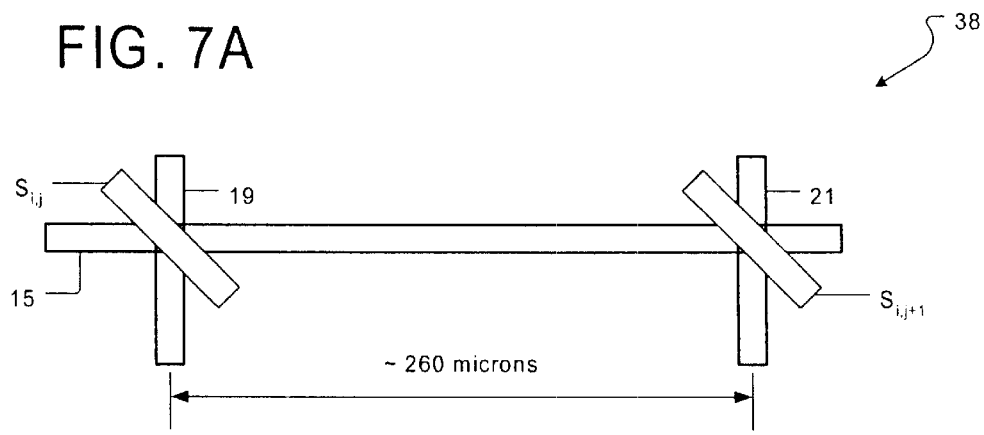
FIGS. 7A, 7B, 7C, 7D, 7E, and 7F illustrate alternative embodiment of the present invention.

Additional embodiments of the present invention are illustrated using FIGS. 7A through and 7F. Referring to FIG. 7A, one possible implementation of a segment of a waveguide is illustrated, for example, portion 38 of the device 10 of FIG. 1 is illustrated. FIG. 7A has portions that are similar to certain portions of FIG. 1. For convenience, portions of FIG. 7A that are similar to portions of FIG. 1 are assigned the same reference numbers and designators. Here, active perturbations —switches $S_{i,j}$ and $S_{i,j+1}$— are illustrated as being apart by a first distance, for example, about 260 microns. In this example, switches $S_{i,j}$ and $S_{i,j+1}$— can be $S_{M,2}$ and $S_{M,N}$ of the device 10 when index i=M and N=3.

Figure 7B:
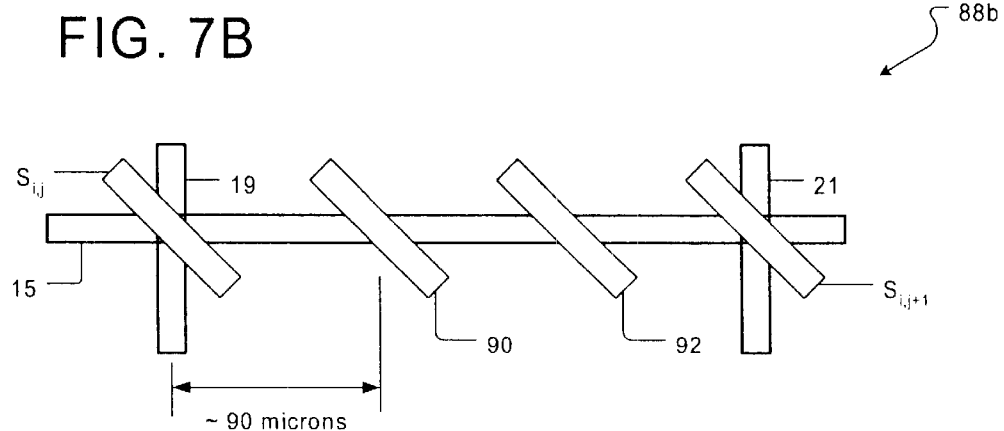

To reduce the insertion loss of the illustrated portion of the device 10, perturbations, active or passive, may be added to reduce spacing between the perturbations. For example, FIG. 7B illustrates one possible implementation of the present invention, for example, portion 88 of the apparatus 80 of FIG. 6 as, portion 88b. FIGS. 7B through 7F have portions that are similar to certain portions of FIG. 6. For convenience, portions of FIGS. 7B through 7F that are similar to portions of FIG. 6 are assigned the same reference numbers and designators. Between the switches $S_{i,j}$ and $S_{i,j+1}$, additional trenches 90 and 92 can be fabricated to decrease the spacing between perturbations, for example, to about 90 microns. An alternative implementation of the present invention is illustrated as portion 88c of FIG. 7C. Here, between the switches $S_{i,j}$ and $S_{i,j+1}$, doped sections 94 and 96 of the waveguide core 15 are used as passive perturbations to decrease the spacing between perturbations. In the example discussed in FIGS. 7B through 7F, switches $S_{i,j}$ and $S_{i,j+1}$ can be $S_{M,2}$ and $S_{M,N}$ of the apparatus 80 when index i=M and N=3.

Figure 7C:
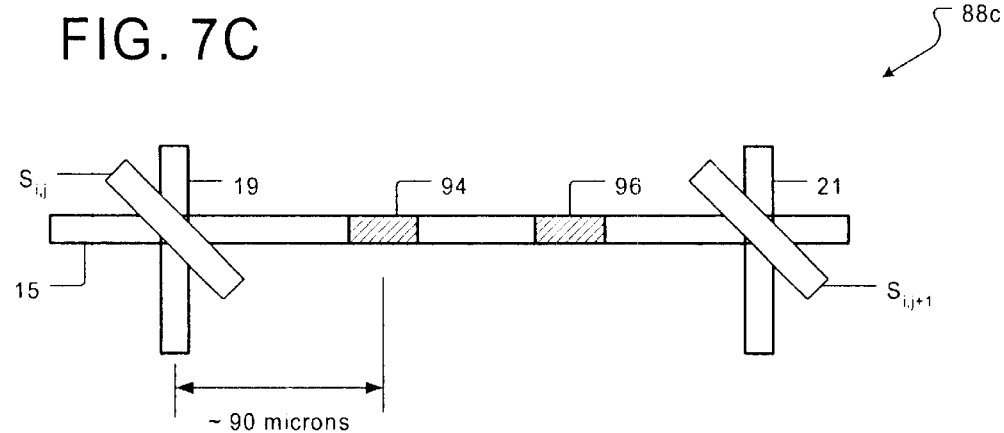

A second alternative implementation of the portion 88 of FIG. 6 is illustrated as portion 88c of FIG. 7C. Here, between the switches $S_{i,j}$ and $S_{i,j+1}$, doped sections 94 and 96 of the waveguide core 15 are used as passive perturbations to decrease the spacing between perturbations.

Figure 7D:
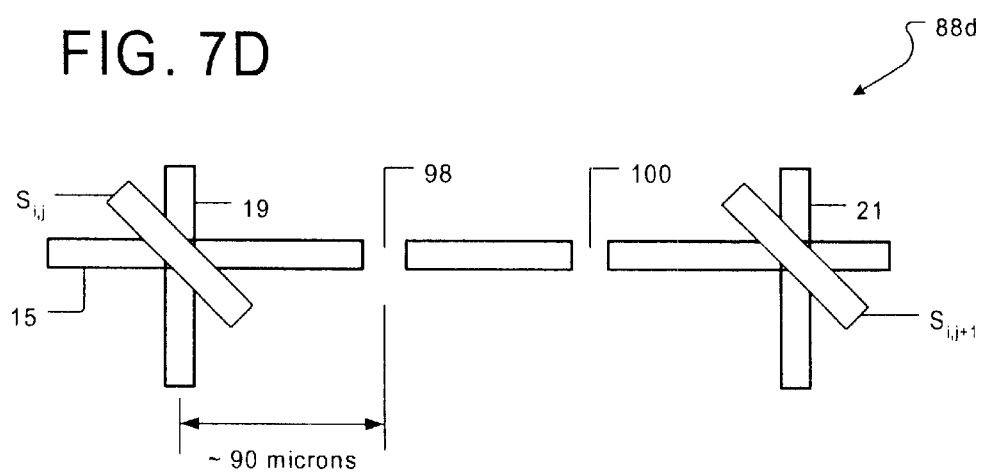

A third alternative implementation of the portion 88 of FIG. 6 is illustrated as portion 88d of FIG. 7D. Here, the passive perturbations 98 and 100 are implemented as discontinuous or broken sections 98 and 100 of the waveguide 15 wherein the passive perturbations 98 and 100 are defined by cladding-filled space between the waveguide segments.

Figure 7E:
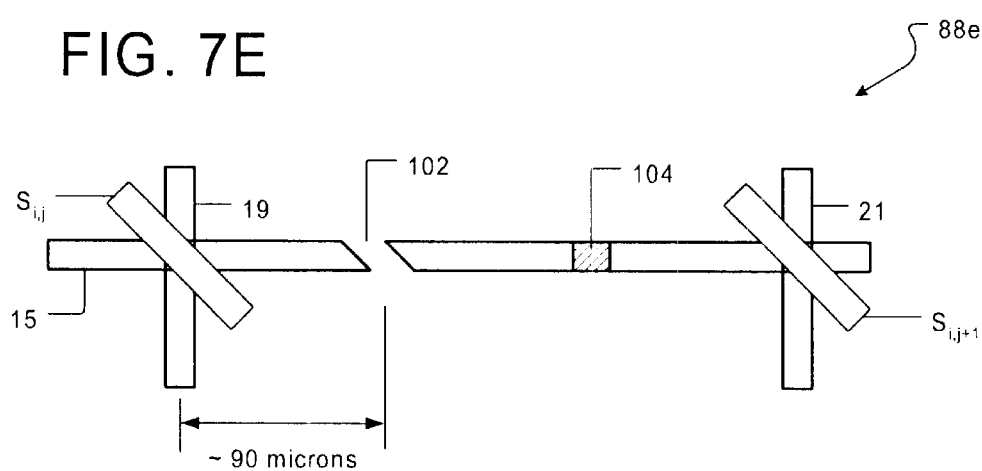

In a fourth alternative implementation illustrated using FIG. 7E, the portion 88 of FIG. 6 is illustrated as a portion 88e having a broken, cladding-filled section 102 and a doped portion 104. Here, the broken section 102 is shown having an angle in respect to the waveguide core 15, the angle being similar to that of the switches $S_{i,j}$ and $S_{i,j+1}$. Further, FIG. 7E illustrates that the waveguide core 15 may include different types of perturbations at the same time.

Figure 7F:
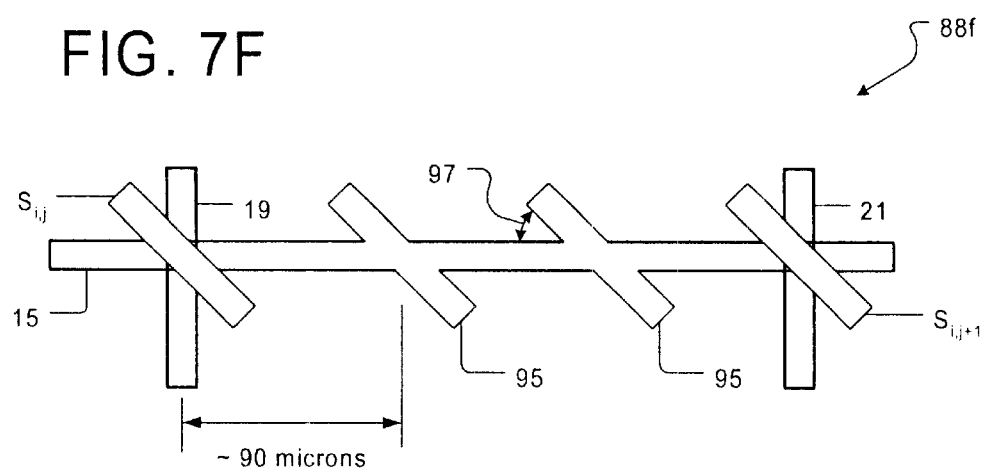

In a fifth alternative implementation illustrated using FIG. 7F, the portion 88 of FIG. 6 is illustrated as a portion 88f. Here, passive perturbations 95 are made by the waveguide core 15 itself. Angle 97 is flexible in order to reduce insertion loss.

From the foregoing it will be appreciated that the optical apparatus of the present invention provides a number of advantages over the prior art. For example, the optical apparatus of the present invention performs switching functions over optical signals at a lower insertion loss than a comparable device of prior art. Although specific embodiments of the present invention have been described and illustrated, the invention is not to be limited to the specific forms or arrangements of parts so described and illustrated. The invention is limited only by the claims.

We claim:

1. A planar lightwave circuit (PLC) comprising:
an array of waveguides intersecting at cross-points, each waveguide having a waveguide refractive index distribution for guiding an optical signal; and
active perturbations for operating on the optical signal; and
passive perturbations having a refractive index distribution different than the waveguide refractive index distribution for reducing insertion loss of the PLC.

2. The planar lightwave circuit recited in claim 1 wherein the passive perturbations are dummy trenches.

3. The planar lightwave circuit recited in claim 1 wherein a first passive perturbation is positioned between active perturbations.

4. The planar lightwave circuit recited in claim 1 wherein periodicity of spacing of the perturbations (both passive and active) is in a range from 70 microns to 110 microns for a waveguide that couples to a single mode fiber.

5. An integrated optical circuit having a waveguide for conducting an optical signal, the circuit comprising:
active perturbations for operating on the optical signal; and
passive perturbations such that spacing between perturbations leads to reduction in insertion loss of the circuit.

6. The circuit recited in claim 5 wherein each of the passive perturbations has a refractive index that is different than refractive index of the active perturbations.

7. The circuit recited in clam 5 wherein insertion loss of the circuit is less than insertion loss of another circuit of identical configuration but without the passive perturbations.

8. The circuit recited in claim 5 wherein a first passive perturbation is between a first active perturbation and a second active perturbation.

9. The circuit recited in claim 5 wherein the first perturbation has a three dimensional refractive index distribution.

10. The circuit recited in claim 5 wherein the waveguide has a waveguide refractive index and a first perturbation within the waveguide has a refractive index that is different than the waveguide refractive index.

11. The circuit recited in claim 5 wherein a first perturbation is implemented as a broke section of a waveguide.

12. The circuit recited in claim 5 wherein the perturbations appear periodically.

13. The circuit recited in claim 12 wherein the periodicity of the perturbations is on the order of 90 microns for a waveguide that couples to a single mode fiber.

14. The circuit recited in clam 5 wherein dependence of insertion loss on wavelength is reduced over a wavelength range of 1450 nm to 1650 nm.

15. A planar lightwave circuit (PLC) comprising:
an array of waveguides intersecting at cross-points, each waveguide having waveguide refractive index distribution for guiding optical signal; and
perturbations for operating on the optical signal, the perturbations spaced to minimize insertion loss of the PLC; and
wherein the perturbations are spaced between 80 and 100 microns.

16. A method of efficiently operating on optical signals within a waveguide of an integrated optical circuit, the method comprising:
operating, using active perturbations, on the optical signal to perform a function;
passing the optical signal through passive perturbations, the active perturbations an the passive perturbations having a predetermined spacing whereby insertion loss is reduced; and
wherein the predetermine spacing is periodic and that periodicity is in a range between 80 microns and 100 microns.

17. A method of fabricating an integrated optical circuit including a waveguide for conducting an optical signal, the method comprising fabricating perturbations in predetermined spacing thereby reducing insertion loss wherein the perturbations include active perturbations and passive perturbations, the perturbations spaced in a range between 80 microns and 110 microns.

18. A method of fabricating an integrated optical circuit including a waveguide for conducting an optical signal, the method comprising fabricating perturbations in predetermined spacing thereby reducing insertion loss wherein the perturbations include active perturbations having liquid filled trenches and passive perturbations of dummy trenches.

19. A method of fabricating an integrated optical circuit including a waveguide for conducting an optical signal, the method comprising fabricating perturbations in predetermined spacing thereby reducing insertion loss wherein the perturbations include passive perturbations defined by space between waveguide segments.

20. An integrated optical circuit having a waveguide for conducting an optical signal, the circuit comprising:
active perturbations for operating on the optical signal;
passive perturbations such that spacing between perturbations leads to reduction in insertion loss of the circuit; and
wherein a first perturbation is implemented as a broken section of a waveguide.

* * * * *